July 27, 1943.  C. A. RIETZ  2,325,426
DISINTEGRATING APPARATUS
Filed July 16, 1940  2 Sheets-Sheet 1
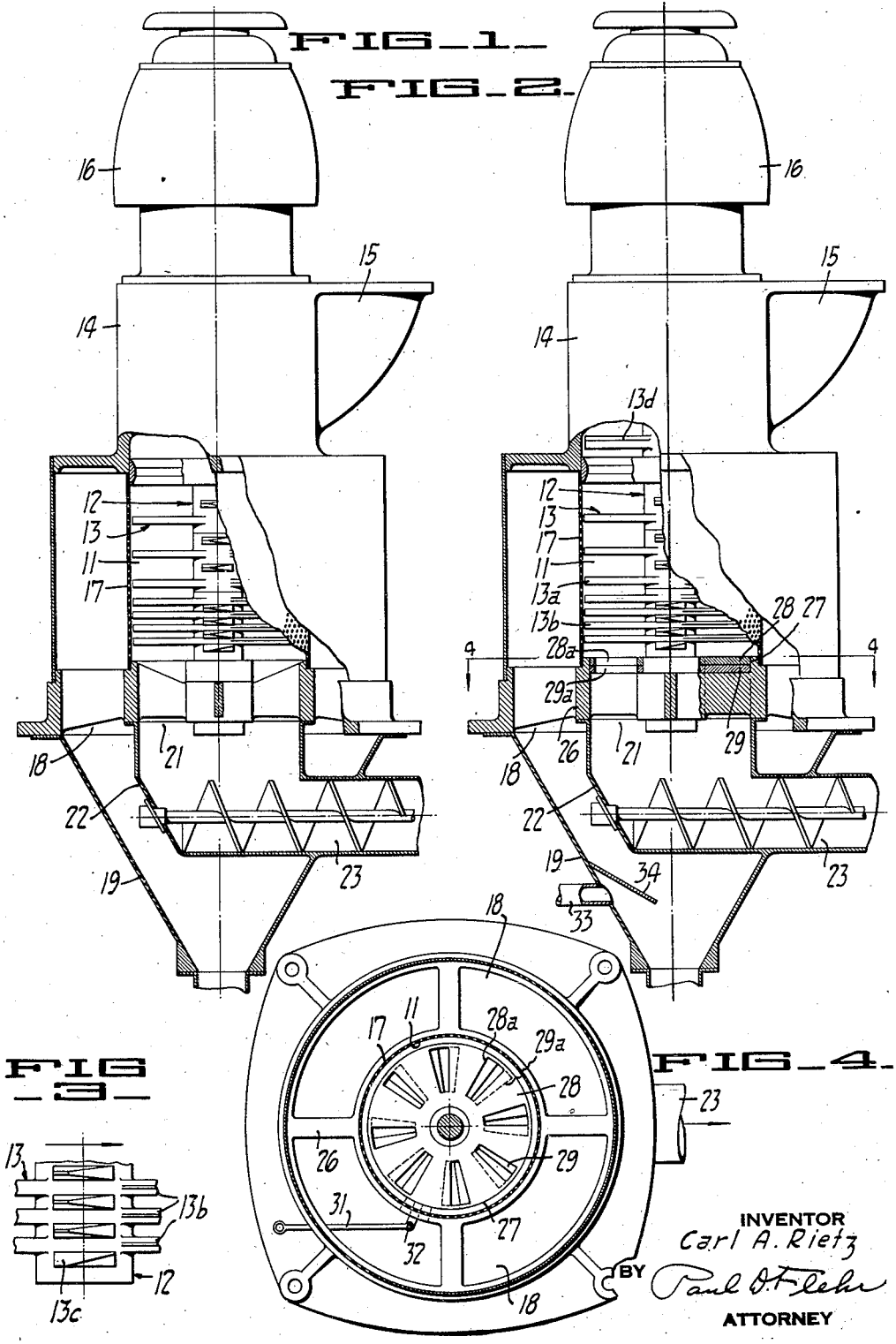
INVENTOR
Carl A. Rietz
BY
ATTORNEY July 27, 1943.                C. A. RIETZ                2,325,426
                        DISINTEGRATING APPARATUS
                        Filed July 16, 1940          2 Sheets-Sheet 2
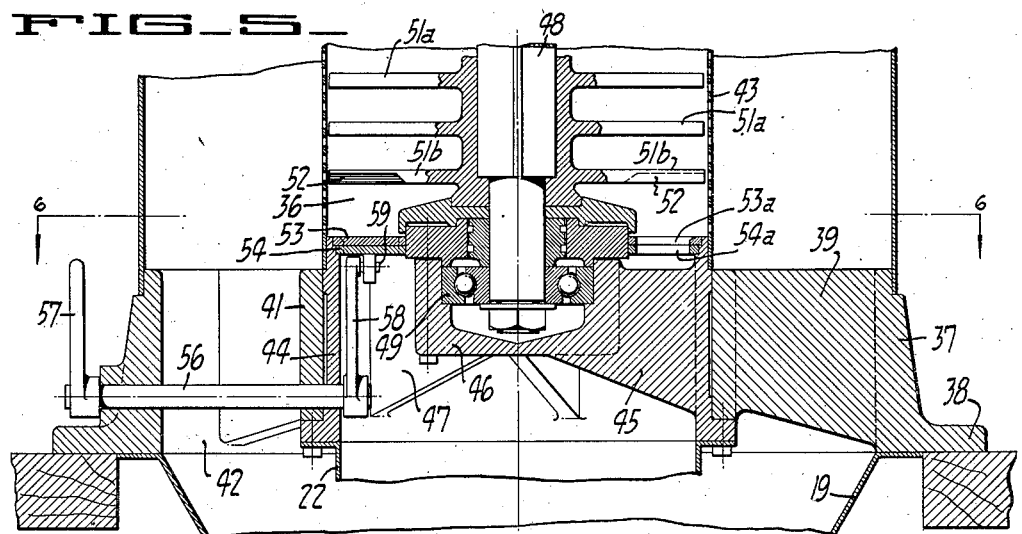
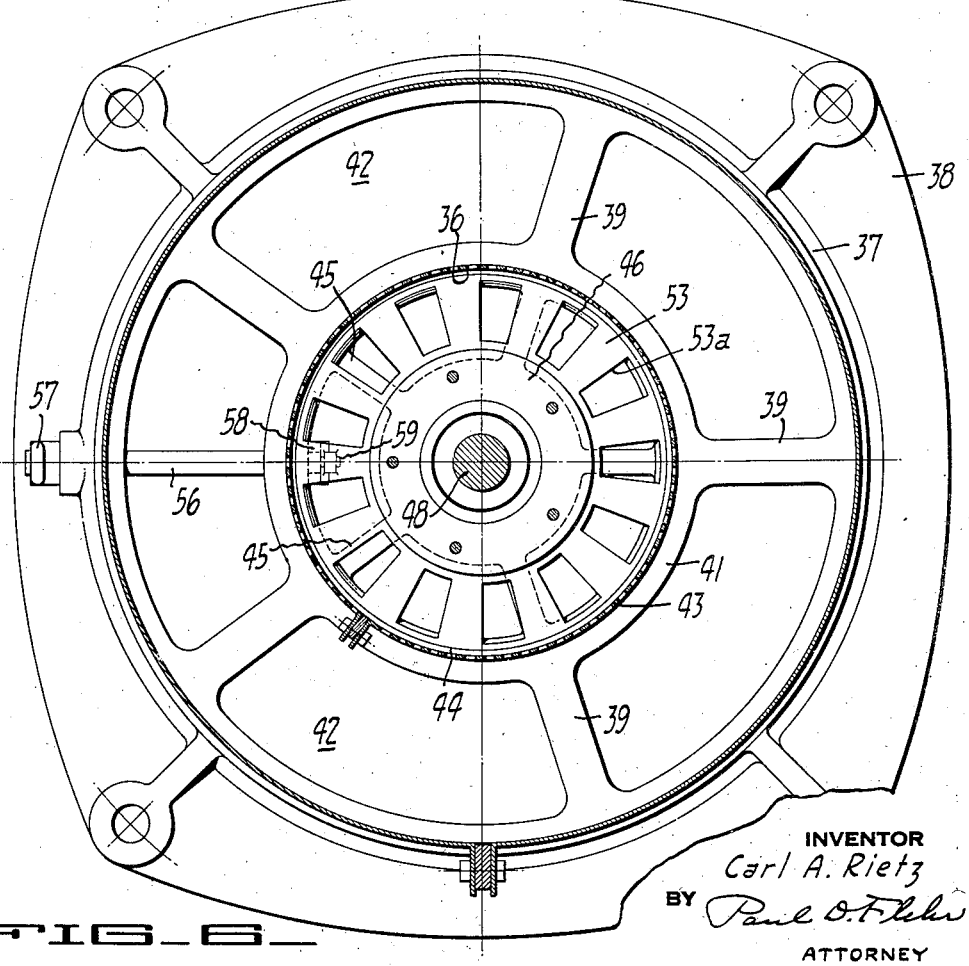
INVENTOR
Carl A. Rietz
BY
ATTORNEY Patented July 27, 1943

2,325,426

UNITED STATES PATENT OFFICE 2,325,426

DISINTEGRATING APPARATUS

Carl A. Rietz, San Francisco, Calif.

Application July 16, 1940, Serial No. 345,733

1 Claim. (Cl. 83—11)

This invention relates generally to disintegrating apparatus.

In the processing of many materials by steps involving a disintegrating operation, it has been common in the past to attempt complete disintegration of material by use of various grinding or attrition devices. With food materials such as vegetables, where it is desired to make an edible purée, complete disintegration of the material may not be desirable in that a considerable part of the hard fiber portion of the vegetable is thus introduced into the final product. It is difficult to effectively remove such hard fiber before distintegration, and after complete disintegration only the oversize fiber can be removed as by screening.

In the disintegration of materials other than vegetables, it frequently happens that the material contains components which can be readily disintegrated, together with components which can be disintegrated only with difficulty. Where it is attempted to disintegrate all of this material to the desired degree of fineness, an excessive and unnecessary amount of power is required. In addition, any equipment which attempts to disintegrate all of the components to the desired fineness necessarily has a limited capacity and is subject to excessive wear.

It is an object of the present invention to provide a disintegrating apparatus which in one operation will both disintegrate and separately discharge two classified components of the disintegrated material. In the case of foodstuffs like vegetables which are to be puréed, one component is finely divided material consisting of the edible portions of the vegetable, while the secondary component is fibrous material relatively difficult to disintegrate, and which is not desired in the final product. In the case of material such as bones which are to be disintegrated to form a product suitable for soup stock or for introduction into various animal foods, the readily disintegratable material of the bone is discharged as one component, while relatively hard slivers and portions of the bone difficult to disintegrate are discharged as the secondary component.

Another object of the invention is to provide apparatus of the above character having means for controlling the discharge of secondary material in order to secure the type of classified components desired.

Additional objects of the invention will appear from the following description in which the preferred embodiment of the invention has been set forth in detail in conjunction with the accompanying drawings.

Referring to the drawings—

Figure 1 is a side elevational view partly in cross section illustrating one form of the machine incorporating the invention;

Figure 2 is a view similar to Figure 1 but showing another embodiment of the invention;

Figure 3 is a partial side elevational view of the lower part of the rotor incorporated in Figure 2;

Figure 4 is a cross sectional view taken along the line 4—4 of Figure 2;

Figure 5 is a vertical sectional view through a further modificational form; and Figure 6 is a cross sectional view taken along the line 6—6 of Figure 5.

Referring to Figure 1 of the drawings, I have shown a disintegrator of the general type disclosed and claimed in my Patent No. 2,153,590, granted April 11, 1939. The machine includes a closed disintegrating chamber 11 in which there is a vertical rotor 12 provided with disintegrating hammers 13. The upper part of the disintegrating chamber connects with the feed chamber 14, into which material to be disintegrated is introduced, as for example by means of a feed hopper 15. Suitable drive means such as an electric motor 16 connects with the rotor 12. A cylindrical shaped screen 17 surrounds the rotor 12, and disintegrated material passed through this screen drops down through the outlet 18, into the hopper 19. At the lower end of the chamber 11, there is an opening 21 which communicates with another hopper 22. This hopper or casing serves as separate means for removing secondary material. Means is provided for controlling discharge of material from hopper 22, such as a valve controlled or orifice discharge, or a feed screw 23 as shown.

The apparatus described above is utilized as follows: Assuming that one wishes to make a vegetable purée from a vegetable such as spinach, the spinach either after preliminary cleaning, and with or without preliminary cooking, is supplied to the disintegrator through hopper 15, or some other suitable feed means. The rotor 12 is driven at a relatively high rate of speed, so that when material drops down into the zone of operation of the rotor it is disintegrated by repeated impact with the disintegrating hammers.

The readily disintegratable leaf portions of the vegetable are reduced to the desired fineness and pass out through the screen 17, and down into the hopper 19. The tougher fiber portion of the spinach finds its way down through the outlet 21 into the hopper 22, and constitutes a secondary discharge of roughage. In this instance in order to control the characteristics of the material withdrawn by way of hopper 22, I regulate the rate of removal of the material, as by means of controlling the rate of rotation of the feed screw 23. For example, with a given rate of removal of fibrous material by screw 23 and for a given rate of introduction of the vegetable to the disintegrator, the hopper 22 will remain filled with the fibrous material, so that the fibrous material passing downwardly from the zone of operation of the rotor is received in a bed of fibrous material formed immediately below the rotor. Formation of such a bed of material immediately below the zone of operation of the rotor tends to form a sharp line of demarcation between the characteristics of the material discharged through hopper 19, and that withdrawn through hopper 22. In other words, by such control little of the desired leaf portion of the vegetable is withdrawn through hopper 22.

By further slowing down the rate of removal by way of screw 23, for a given rate of introduction of the material, more resistant fibers are subjected to additional disintegration, and the amount of fiber removed by screw 23 is reduced. It will be evident that in practice the rate of operation of screw 23 is adjusted to secure the results desired, that is, a proper demarcation between the characteristics of the materials discharged, to effect removal of tenacious fiber to a practical degree. It is possible to operate at relatively high capacity because the disintegrator need not perform the work of subdividing the tenacious fiber.

As a result of the method described above, it is evident that one may form a fine high quality purée from various vegetables, with the purée being relatively free of undesired tenacious fiber. In addition to vegetables such as spinach, the method and apparatus can be employed for a wide variety of vegetables including, for example, beans, peas, asparagus, and tomatoes. In the case of tomatoes, the roughage removed through hopper 22 consists of seeds and stems, together with some skin of the tomato. In addition to use in conjunction with vegetables, the same method can be employed in conjunction with berries and fruits such as loganberries, blackberries, grapes, raisins, apples, and the like. In the case of fruits having seeds or pits, such pits or hard fragments of the pits can be removed through the hopper 22.

Where the material being treated contains considerable water, as in the case of many vegetables and fruits, the disintegrated material passing into the hopper 19 will be in the form of a pulp or liquor, and can be removed and delivered for further treatment through suitable pumping means. However, the roughage delivered through hopper 22 will have relatively little water or juices from the vegetable or fruit. This is because the roughage is stripped of most of the readily disintegratable fiber or flesh which contains the greater part of the vegetable or fruit juices. In other words, a dehydrating action takes place simultaneously with disintegration and classification.

With certain material such as tomatoes and berries, it is desirable to make use of a screen 17 having relatively small openings to prevent passage of seeds. Such a fine screen can be formed by a sheet of woven wire screening of suitable mesh, between two coarse reinforcing screens.

In addition to using the apparatus for disintegration of vegetables having considerable moisture content, I can disintegrate dehydrated vegetable matter such as alfalfa, corn stalk, dried peas, and the like. Also, I can disintegrate harder materials such as bones, where it is desired to form a disintegrating bone material for use in soup stocks or various animal foods. Readily disintegratable portions of the bone pass out through the screen 17 and hopper 19, while relatively hard portions of the bone are removed through hopper 22. Thus, the material removed through hopper 19 is freed from hard splinters of the bone which might be difficult to remove by other methods, and which might make the product valueless for various food preparations.

Figures 2 to 4 inclusive show a modified type of disintegrator in which means is provided immediately below the zone of operation of the rotor for effecting a controlled discharge of secondary material or roughage. Thus, in this instance the casting 26, which underlies the rotor, is provided with an annular recess 27 in its upper face. Two annular plates 28 and 29 are seated within recess 27 with the lower plate rotatable, and the upper plate stationary. These plates are provided with circumferentially spaced slots or openings 28a and 29a (Figure 4) which may be brought into or out of registry by turning the plate 29. A slidable operating rod 31 extends to the exterior of the machine, and has its inner end provided with a pivotal connection 32 to the lower plate 29. It will be evident that this arrangement affords orifices below the zone of operation of the rotor which can be controlled as to effective area by manipulating the operating rod 31.

In conjunction with the controlling means described above, it is desirable to employ a rotor having a lower hammer or hammers adapted to urge the roughage material downwardly through the orifices 28a and 29a. The rotor illustrated in this instance makes use of an upper group of hammers 13a which are spaced a substantial distance apart as illustrated. The lower group of hammers 13b are disposed close together, so that as a group they almost completely sweep through the space forming the zone of operation. The two lowermost hammers 13c have lower beveled faces in order to urge the secondary material downwardly. Supplemental top hammers 13d are provided above the main part of the rotor. These hammers are beveled in the same manner as hammers 13c. They serve to urge material downward into the disintegration zone, and they also serve to prevent feed material from bridging over in the housing above the hammers 13b. In addition, hammers 13d effect a preliminary subdivision of material. For example, with material like lettuce they serve to shred the material before it enters the main zone of disintegration.

In utilizing the machine illustrated in Figures 2 to 4 inclusive, the feed screw 23 can be at all times operated at a sufficient speed to take away the roughage or secondary material. Control of the proportionate amount of roughage removed from the machine is effected by adjusting the setting of the lower orifice plate 29. Assuming that the machine is operating upon a vegetable such as spinach or green beans from which it is desired to make a purée the fibrous roughage which classifies out from the attrition zone forms a bed below the hammers 13c and upon the orifice plate 28, and continually finds its way through orifices 28a and 29a to the discharge screw 23.

Where wet material is hot when fed to the disintegrator, it is possible to withdraw considerable vapor to effectively reduce its moisture content. For this purpose a pipe 33 is shown connected to hopper 19, and the inner end of this pipe is protected by baffle 34. Pipe 33 can connect to suitable vacuum pump and condensing means to subject the interior of the machine to a partial vacuum.

Figures 5 and 6 illustrate a modification in which a special treatment zone 36 is provided below the zone of operation of the rotor, for treatment of the secondary discharge. The main frame of the machine in this instance includes the base supporting ring 37 which is provided with a flange 38 for attachment to a suitable foundation or supporting floor. Spaced webs 39 serve to connect ring 37 to the inner ring 41, with a spacing between the webs 39 to provide openings 42 for the discharge of the disintegrated material passing through the screen 43.

Ring 41 serves as a mounting for an inner structure which includes the ring 44, the inwardly extending webs 45, and the inner hub 46 carried by the webs 45. The openings 47 between the webs 45 correspond to the opening 21 for secondary material in the modification of Figures 1 and 2.

The shaft 48 of the rotor has its lower end provided with a thrust bearing 49 within the hub 46. The rotor hammers 51a and 51b have their outer ends in relatively close apposition to the screen 43, and the lowermost hammers 51b have their lower faces beveled, as indicated at 52. This beveling of the lowermost hammers serves to urge secondary material downwardly into the zone 36 and to apply pressure upon this material depending upon how the machine is adjusted and operated.

To control the discharge of secondary material from zone 36, the two annular plates 53 and 54 are provided, corresponding to the plates 28 and 29 of Figure 2. These plates also have radial slots 53a and 54a. The upper plate 53 is mounted upon the upper edge of ring 44, while the lower plate is mounted for rotation so that the openings 53a and 54a can be brought into and out of registration. The means for adjusting the lower plate 54 in this instance consists of a shaft 56 having its outer end provided with a handle 57. The inner end of shaft 56 is provided with a lever 58, the upper end of which has a pin and slot connection 59 to the lower side of plate 54. Thus by turning handle 57, the lower plate 54 can be turned a sufficient amount to either bring the openings 53a and 54a into exact registration for full open position, or to cause no registration whatsoever between the openings, in which event no material can discharge through the plates or to intermediate positions.

The apparatus of Figures 5 and 6 is capable of handling a wide variety of materials, as for example for the manufacture of a pulp or purée from materials such as raw or cooked tomatoes, peas, green beans, or asparagus. Assuming that such a material is being supplied to the machine, disintegration takes place within the zone of operation of the rotor, and the desired disintegrated pulp passes through screen 43 to the discharged from the hopper 19. Portions of the material which tend to resist disintegration, such as pieces of skin, seeds, kernels, and woody fiber, pass down through the zone of operation of the rotor into the zone 36. When the lower plate 54 is positioned so that openings 53a and 54a are in exact registration, there will be no substantial accumulation of such secondary material in zone 36, and this material will pass freely down through the plates 53 and 54, into the hopper 22. However, when handle 57 is adjusted so that the discharge from the lower side of zone 36 is choked down, a bed of such material accumulates in zone 36, and this mass of material in zone 36 is placed under pressure because of the action of the lower hammers 51b. The beveling 52 on these hammers acts downwardly on the mass of material in zone 36 to place the lower mass of material under considerable pressure, and also to impart to this mass of material a virtual beating action. As a result of pressure applied to material in zone 36, this material is further dehydrated to a substantial degree before it is discharged from the lower side of zone 36. Juices and pulp extracted from the secondary material in this manner pass outwardly through that portion of the screen 43 which surrounds the outer periphery of zone 36.

The degree of pressure applied to material in zone 36 can be adjusted by changing the setting of handle 57, or in other words by adjusting the extent to which one chokes off discharge of material from the lower side of zone 36.

The bed of material in zone 36 is also desirable in that should any foreign objects like tramp iron be supplied to the machine, together with the material being disintegrated, such tramp iron will be thrown down into the bed of material in zone 36, and will be retained by the bed of material and thus prevented from re-bounding into the zone of operation of the rotor. Should the tramp iron be sufficiently small, it will pass down through the openings 53a and 54a. Otherwise, it will be retained in zone 36 until the machine is shut down and cleaned.

Due to the dehydrating action taking place in zone 36, it will be evident that utmost recovery of the desired juices can be had when forming pulps or purées from materials of the class specified. Thus, wastage can be reduced to a minimum, and the secondary discharge is dehydrated to an optimum degree.

In the foregoing, reference is made to the disintegration of materials containing considerable amounts of water. My apparatus can be used, however, for the disintegration of materials containing very little if any moisture content. In this instance, the dry powdered fraction can be removed from the hopper 19 by a current of air, as for example by attaching the intake of a blower to the discharge of the hopper. The secondary discharge in this instance will consist of particles or fragments relatively difficult to disintegrate, but constituting the minor portion of the material being disintegrated.

I claim:

In a disintegrating apparatus, an upright rotor provided with disintegrating hammers, said hammers being progressively spaced at shorter intervals from the top to the bottom of the rotor, the hammers at the lower end of the rotor having lower inclined faces to urge material downwardly, a screen surrounding the zone of operation of the rotor and through which disintegrated material passes, means for supplying material to be disintegrated to the upper inlet end of the zone of operation of the rotor, and controlled discharge means for effecting discharge of material from a space below the lower hammers of the rotor whereby a mass of secondary roughage material is caused to accumulate in said space and be subjected to pressure by the action of said lower hammers, said space being surrounded at least in part by the lower portion of said screen, and said controlled discharge means comprising a plate within and at the bottom of the screen having a plurality of radial openings circumferentially spaced, and manually controlled means to simultaneously adjust the size of each of said openings.

CARL A. RIETZ.